March 24, 1970 J. L. KING ETAL 3,502,410
APPARATUS AND METHOD FOR REDUCING EXPOSURE
DETERMINATION ERRORS IN COLOR PRINTERS
Filed April 25, 1967 5 Sheets-Sheet 4

JAMES L. KING
GARY E. JONES
EDWIN UHRICH
INVENTORS

BY *Daniel E. Dragon*

*Robert W. Hampton*
ATTORNEYS

March 24, 1970   J. L. KING ET AL   3,502,410
APPARATUS AND METHOD FOR REDUCING EXPOSURE
DETERMINATION ERRORS IN COLOR PRINTERS
Filed April 25, 1967   5 Sheets-Sheet 5

JAMES L. KING
GARY E. JONES
EDWIN UHRICH
INVENTORS

BY
ATTORNEYS

United States Patent Office

3,502,410
Patented Mar. 24, 1970

3,502,410
APPARATUS AND METHOD FOR REDUCING EXPOSURE DETERMINATION ERRORS IN COLOR PRINTERS
James L. King, Gary E. Jones, and Edwin Uhrich, Rochester, N.Y., assignors to Eastman Kodak Company, Rochester, N.Y., a corporation of New Jersey
Filed Apr. 25, 1967, Ser. No. 633,523
Int. Cl. G03b 27/78
U.S. Cl. 355—38                 6 Claims

ABSTRACT OF THE DISCLOSURE

An apparatus and method of exposure determination for use in photographic color printing systems which reduces the exposure errors that are commonly encountered when the original subject matter contains a predominance of one color ("subject failure"). A statistical discriminant function of the large area transmission densities of the negative or transparency to be printed is used to predetermine the likelihood that this original will exhibit subject failure along some particular color axis. The magnitude of this discriminant function is an estimate of the degree of failure, and is used to compute proportionate amounts of correction to be applied in the determination of more nearly optimum red, green and blue exposures.

---

The present invention relates to the making of photographic color prints or transparencies and particularly to a new approach to the estimation of optimum exposures for the photographic printing of color originals.

In previous exposure determination systems for making color prints, the criterion used to determine printing exposures has been related to the integrated red, green and blue transmittances of the entire negative. Any departure of these parameters from "normal" or average transmittance values is usually attributed to camera exposure conditions, variability encountered in manufacturing or processing of the film, changes in the film due to improper storage, color quality of the exposing illuminant and so forth. These sources of variability have been compensated for by adjusting the printing light source intensity during red, green and blue exposures to levels which will normalize the resulting integrated transmittances to a single aim-point in color space. An equivalent method is to print with constant source flux and adjust the exposure times to normalize the variability in the integrated transmittances of the negatives. In other words, such systems attempt to balance the resulting red, green and blue exposures to levels which, in combination, will print to a near-neutral color balance, i.e., "gray" or a hue near gray. Such printing system are disclosed in U.S. Patents 2,571,697, Evans, and 2,566,264, Tuttle el al. These printing systems have produced very satisfactory results from a large majority of the negatives of a given film type.

It has been found, however, that there are residual color errors in prints made by these known methods of exposure determination. This has been particularly true since the introduction of dual-purpose color films designed to be exposed with either daylight or artificial illumination, as distinguished from earlier single-purpose color films which were balanced for use with only one type of light, i.e., only daylight or artificial light. Another distinction of these newer dual-purpose color films is that no color correction is made during camera exposure but only during printing. Thus the variability in the color balance of negatives which the printing system must accommodate has been greatly increased.

In U.S. Patent No. 3,029,691, issued Apr. 17, 1962, to Goddard et al., there is disclosed an exposure determining system wherein two different aim-points are incorporated, i.e. the system will correct all originals to either of two balances, one for originals exposed by daylight and the other for originals exposed by artificial light. Said patent further discloses a discriminator for determining whether the original was exposed by daylight or artificial light. It has been found, however, that this system of employing two discrete color balance aim-points often results in severely non-uniform prints from similar negatives as a result of discrimination errors.

In U.S. Patent 3,120,782, issued Feb. 11, 1964, to Goddard and Huboi, there is disclosed an exposure determining system based on a linear combination of the red, green and blue large area transmission densities (LATD) of the negative to be printed. Thus, the red exposure is made a function of all three LATD's rather than being based on red transmittance alone. Said patent has made it possible to easily adjust the rate of correction which the printer will introduce for variations in the LATD's of the originals being printed. Thus, the correction level or rate of correction for illumininant variability can be made sufficiently high to adequately reduce the resultant color variability in prints without need for the dual-aimpoint discriminator system.

While high rates of printer correction are desirable to compensate for the sensitometric problems associated with camera exposure level, spectral quality of the exposing illuminant, film deterioration due to improper storage, processing variations and so forth, these high levels of correction actually result in poorer quality prints when the original scene contains a predominance of one color. Such originals violate a basic assumption of the large area monitoring concept, namely, that the large area transmission densities are representative of the densities of the principal subject area. A good example of this subject-failure phenomenon is a photograph of a baby on a red blanket or rug which occupies a large portion of the scene. In such a case, the printing densities of the principal subject area may be perfectly average or normal, yet the red large area transmission density of the original will be abnormally high. If the exposure determination system is adjusted to fully correct for this departure of the LATD from normal, the resulting print will be excessively cyan, i.e., flesh tones and near-neutral areas will be extremely cyan and the red background areas will be poorly reproduced as a "grayish" red. Similar failures occur when the principal subjects are photographed against a background of predominantly blue sky or water. The large area density monitoring system does not sense the fact that the unusually high blue density of the negative is not typical of the principal subject area. When the full correction capabilities of the exposure determination system are being utilized, too much blue exposure will be given, and the color balance of the resulting print will be objectionably yellow. Obviously, subject-failure errors are not limited to any particular colors, but the most frequently encountered cases are associated with red backgrounds (furniture, clothing, etc.), green grass or foliage, and blue sky or water.

Thus, very low rates of correction for LATD variability are desirable when printing originals which are normal in a sensitometric sense but abnormal in the sense that the distribution of colors in the original scene does not integrate to a "gray."

This general problem is discussed at length in an article in the Journal of the SMPTE, April 1956, entitled "Exposure Determination Methods for Color Printing: The Concept of Optimum Correction Level," by Bartleson and Huboi. The authors conclude that there is an optimum "compromise" correction level for any integrated transmittance printing system which can be derived using linear regression techniques to provide the best statistical "fit" to the characteristics of the negative or transparency population being printed. In general, this optimum correction level falls in the range of 70% to 90% of full correction, depending on the season of the year. The Goddard-Huboi Patent 3,120,782, referred to previously, has greatly facilitated the attainment of these theoretically optimum correction levels.

Color subject failure remains a serious problem, however, even at correction levels as low as 70%. In more typical situations where correction levels of 85% to 90% are required to adequately normalize the "real" errors in the negative or transparency population, the anomalous errors due to scene attributes result in extremely poor quality prints.

It is therefore an object of the present invention to provide a system which will distinguish between those originals that are likely to exhibit a significant amount of color subject failure and those which are not.

It is a further object of the invention to automatically introduce compensating adjustment in the exposure determining system for these potential exposure errors without compromising the correction level of the printing system for non-subject-failure originals.

It is an additional object of the invention to provide this compensation for subject-failure errors in amounts proportional to the degree of error which the negative or transparency is likely to produce without said compensation.

These and other objects of the invention are accomplished by measuring the red, green and blue large area transmission densities of the original. These densities are used as the parameters of a discriminant function, the magnitude of which provides an empirical measure of the degree of subject failure which is likely to occur along a particular color axis. Voltage analogs of the red, green and blue exposure adjustments required to more nearly optimize the exposure levels for a particular original are then computed as a non-lonear function of the discriminant equation. When combined with exposure determining voltages derived by earlier methods, e.g., the Goddard-Huboi patent of Feb. 11, 1964, the corrective action of this invention significantly reduces the frequency and severity of subject-failure defects which have been characteristic of integrated transmittance monitoring systems heretofore.

For a better understanding of the invention, reference should be made to the drawings wherein.

Figure 1:
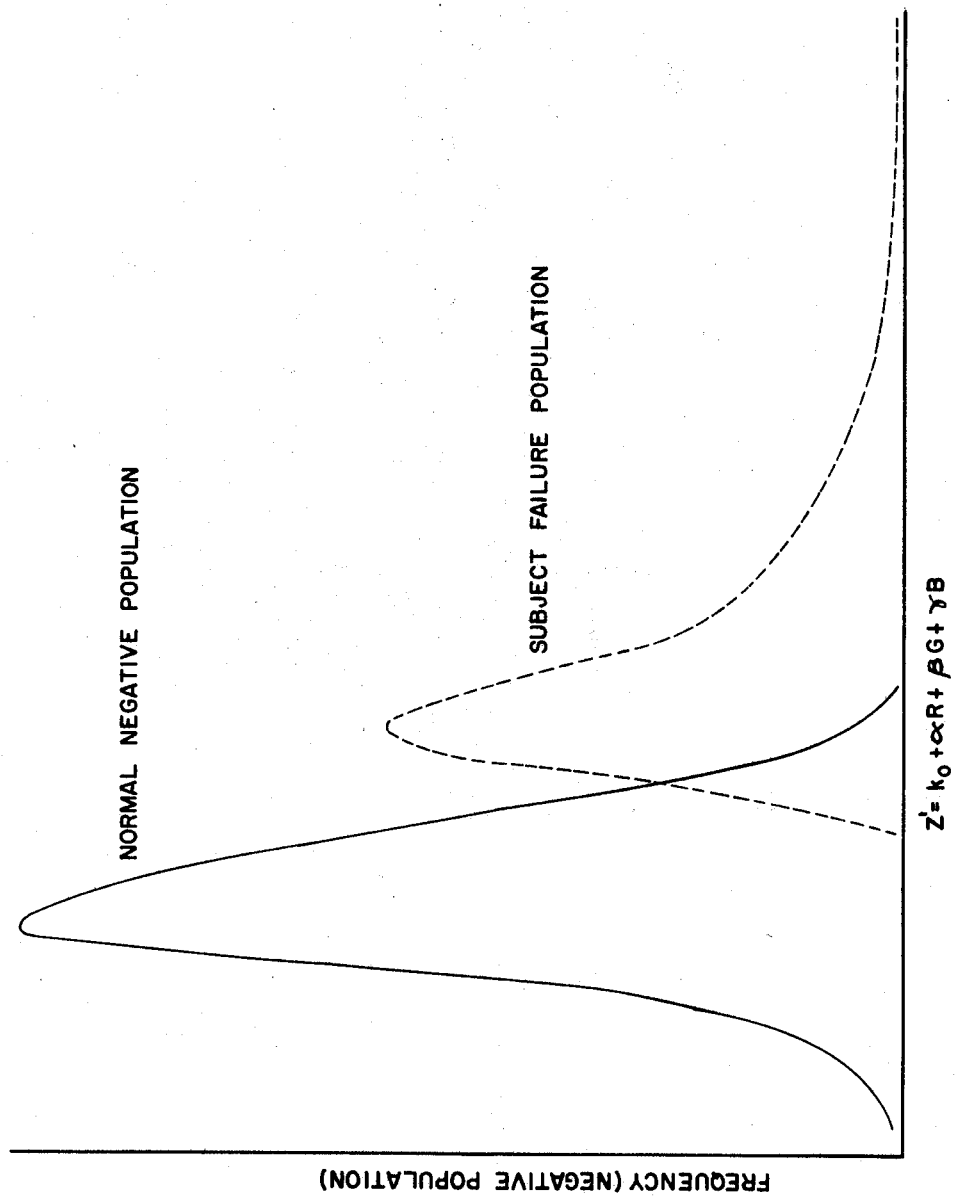
FIG. 1 shows a statistical distribution of originals which do not exhibit subject failure versus the discriminant function produced by the apparatus of the invention, and also a statistical distribution of subject-failure originals versus the same discriminant function.

Referring to FIG. 1, there is shown in solid line a frequency distribution of non-subject-failure originals to be printed versus the discriminant function hence to be described. In dotted lines is shown a distribution of originals typical of those which exhibit color subject failure. The particular example in this case represents red subject-failure originals. Similar distributions exist for other colors. As can be seen from the graph of FIG. 1, if the discriminant value falls under the curve of the dotted line, the original tends to produce subject failure. In general, as the magnitude of Z increases, the degree of subject failure also becomes more severe. This discriminant function has been derived as:

$$Z = k_o + \alpha R + \beta G + \gamma B - I$$

where:

R, G, and B are the voltage analogs of the red, green, and blue large area transmission densities (LATD voltages) of the original being printed;

$\alpha$, $\beta$, and $\gamma$ are coefficients;
$k_o$ is a constant;
$I = O$ for $(B-G) < k_1/\mu$
$I = \mu(B-G) - k_1$, for $(B-G) \geq k_1/\mu$;
$k_1 = $ a constant
$\mu = $ a coefficient As will be noted from FIG. 1, there is an overlap in the frequency distribution of the normal original population and the subject failure population. The normal originals which exhibit a discriminant value typical of a subject failure original are usually those which have been exposed with very warm illuminants such as ordinary household tungsten lighting. It is therefore important that the system be able to distinguish between an original which was exposed with a very warm illuminant and a subject, failure original. This is the function of the above I term. This I term in the complete discriminant function is intended to reduce the correction in proportion to the extent to which the original is typical of those which have been exposed with a very warm illuminant. As can be seen from the equation, the I function decreases the Z value in proportion to the amount by which the green LATD exceeds the blue.

The discriminant function is not used until it exceeds zero, thus originals which do not produce a positive Z value will be handled by the printer exposure determination system in accordance with the large area monitoring concepts derived by Evans and others as described previously. When a given original produces a Z voltage greater than zero, however, this output is used directly to compute three auxiliary exposure determination voltages, each of which is a non-linear function of Z. These voltages are the analogs of the exposure corrections required for each color exposure (red, green, and blue). When added to the normal exposure determination voltages, they have the effect of reducing the exposure for one color and increasing the other primary color exposures in proportional amounts. An example would be to decrease the red while increasing the green and blue, so as to produce a warmer, more pleasing color balance at the same average (neutral) density level. The exposure corrections for this example can be expressed as follows:

$$\Delta E_B = -(b_1 + \gamma_1 Z_R) \text{ for } o < Z_R < z_1 \qquad (3)$$

$$\Delta E_B = -(b_2 + \gamma_2 Z_R) \text{ for } z_1 < Z_R < z_2 \qquad (4)$$

$$\Delta E_R = -\gamma_3 (\Delta E_B) \qquad (5)$$

$$\Delta E_G = -\gamma_4 (\Delta E_R) \qquad (6)$$

where:

$\Delta E_R$, $\Delta E_G$, $\Delta E_B$ are the voltage analogs of the estimated exposure corrections required
$b_1$, $b_2$, $z_1$, $z_2$ are constants (voltages)
$\gamma_1 \ldots \gamma_4$ are coefficients The same method outlined in the example above is used to correct cases of subject failure of other colors, such as blue subject failure which would occur when printing scenes having large amounts of sky and water. Of course, the coefficients in the discriminant function would take on considerably different values. The exposure correction voltages for most blue subject failures can be expressed as follows:

$$Z_B = k'_0 + \alpha' R + \beta' G + \gamma' B \quad (7)$$
$$\Delta E_R = -(C_1 + \delta_1 Z_B) \text{ for } 0 < Z_B < z_1 \quad (8)$$
$$\Delta E_R = -(C_2 + \delta_2 Z_B) \text{ for } z_1 < Z_B < z_2 \quad (9)$$
$$\Delta E_B = -\delta_3 (\Delta E_R) \quad (10)$$
$$\Delta E_G = -\delta_4 (\Delta E_B) \quad (11)$$

By essentially duplicating the equipment required to correct subject failure along one color axis, correction of this defect along other color axes can be accomplished concurrently. When the coefficients in the respective discriminant functions are correctly determined, there is no problem of interaction between the Z functions.

Figure 2:
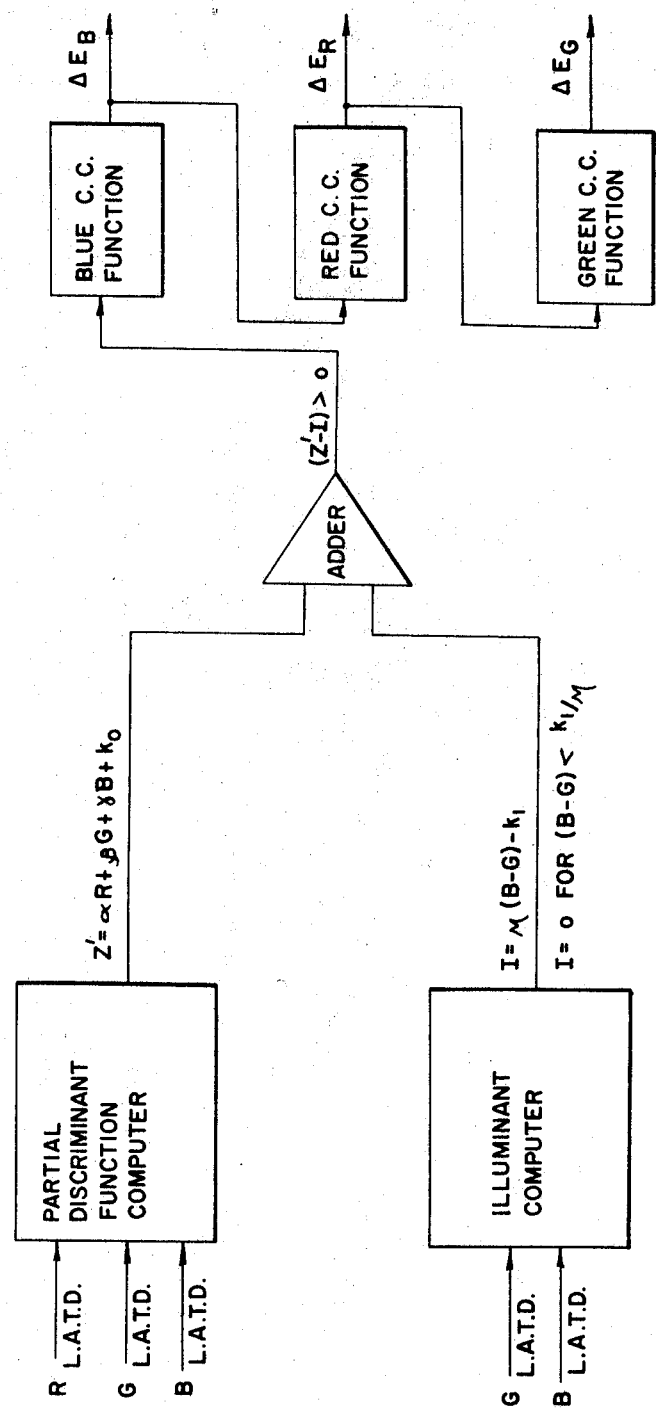
FIG. 2 shows a functional diagram of the color subject failure correction circuit.

A functional diagram of the invention is shown in FIGURE 2. Photometers which measure the red, green and blue LATD of the original provide inputs for the discriminant function computer and the illuminant computer. As shown in the diagram, the output from these computers is combined in an adder circuit to produce the complete discriminant function, $Z = k_0 + \alpha R + \beta G + \gamma B - I$. Values of Z greater than zero are provided as inputs to the red, green and blue color correction circuits which generate $\Delta E_R$, $\Delta E_G$ and $\Delta E_B$ as continuous, non-linear functions of Z. The resulting outputs are voltage analogs of the exposure adjustments required to offset the subject-failure effects which the printer would otherwise produce. For example, if the exposure determining system is of the type disclosed by Goddard and Huboi, $\Delta E_{R,G,B}$ may be combined with, and hence used to modify, the normal exposure analog voltages produced by said system. For other systems, appropriate means must be employed to convert the $\Delta E_{R,G,B}$ voltages to whatever parameters are used to control the final red, green and blue exposures.

Figure 3:
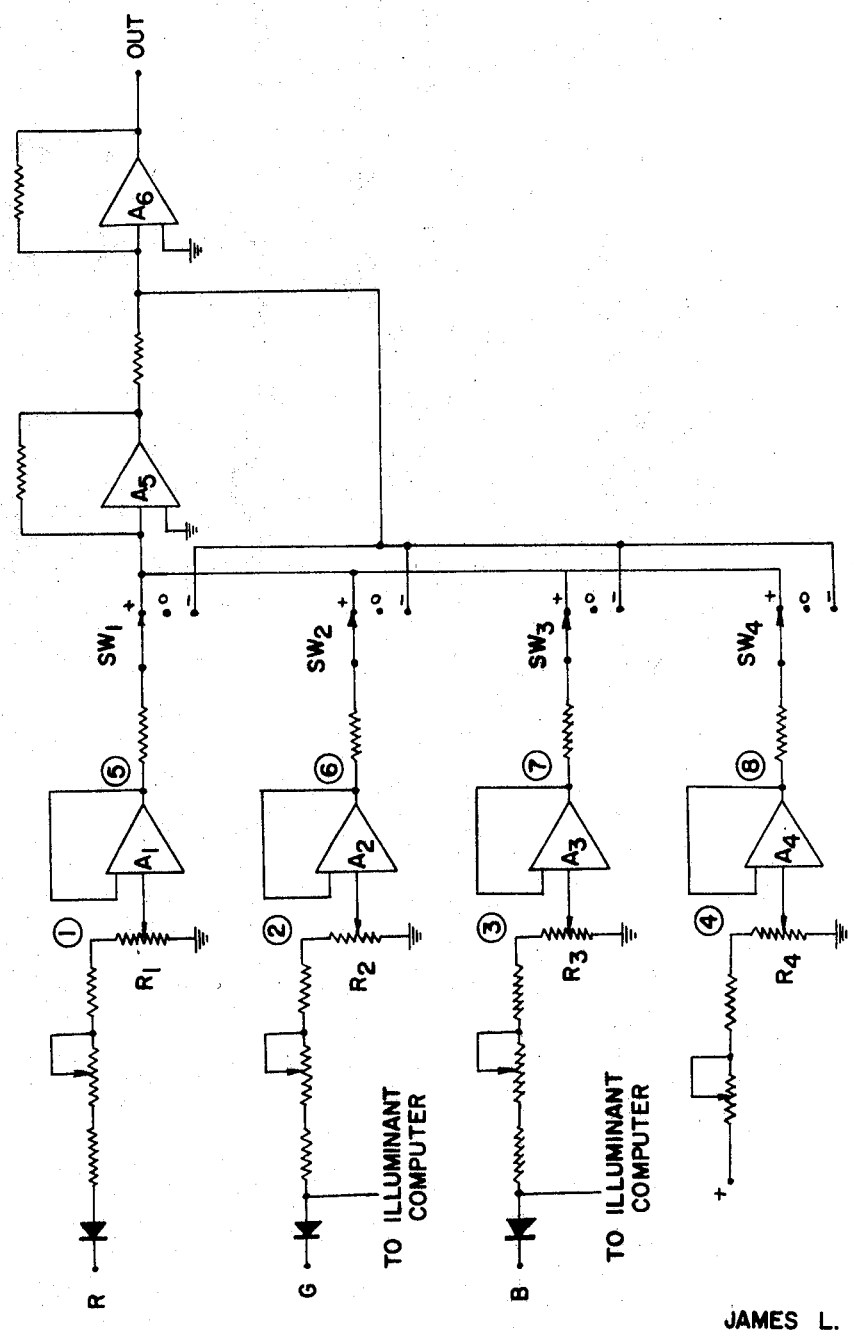
FIG. 3 shows a circuit diagram of the first part of the discriminant function computer which solves the equation $Z' = k_o + \alpha R + \beta G + \gamma B$.

Referring to FIG. 3, there is shown a detailed circuit diagram of the partial discriminant computer itself. Each of the inputs labeled R, G and B receive the output of a photodetector which monitors the red, green and blue large area transmission densities, respectively. The input resistances shown are proportioned so that the following voltage levels are present at:

Point 1 = $R/5$
Point 2 = $G/5$
Point 3 = $B/5$
Point 4 = 10 volts

The voltages present at points 1, 2, 3, and 4 are multiplied by a factor of from 0 to .99 as determined by the settings of resistors $R_1$–$R_4$. Resistors $R_1$–$R_4$ are attached to direct reading dials such that the output at amplifier $A_6$ is directly related to the reading on the dial. As a result, the resistors $R_1$–$R_4$ are actually coefficient values in the equation to be solved. Therefore, the following voltage levels are present at:

$$\text{Point } 5 = \frac{R}{5}\alpha$$

$$\text{Point } 6 = \frac{G}{5}\beta$$

$$\text{Point } 7 = \frac{B}{5}\gamma$$

$$\text{Point } 8 = 10k_0$$

Amplifiers $A_1$–$A_4$ are connected as voltage followers and serve the purpose of isolating the voltage dividers from the input resistors of adder circuit amplifiers $A_5$ and $A_6$. This isolation ensures a linear relationship throughout the range of resistors $R_1$–$R_4$.

Switches $SW_1$–$SW_4$ provide polarity versatility for each of the inputs to the adder circuit.

The adder circuit, which consists of amplifiers $A_5$ and $A_6$, is designed to have a constant gain of 5 for inputs at points 5, 6 and 7 and a gain of 1 for the input at point 8. As a result, the following equation is formed at the output of amplifier $A_6$:

$Z' = \alpha R + \beta G + \gamma B + 10k_0$ where $\alpha$, $\beta$, $\gamma$ and $k_0$ have a range from 0 to .99.

In order to complete the discriminant function, the term I must be subtracted. This I term is the illuminant inhibitor shown above, $I = \mu(B-G) - k_1$. The addition of this I term is accomplished using the circuit shown in FIG. 4. Amplifiers $A_{11}$ and $A_{12}$ are used to solve this equation. The desired value of $k_1$ is obtained by adjustment of resistance $R_{11}$ (taking into account the forward voltage drop across the diode $D_3$). Only positive voltages at the output of amplifier $A_{12}$ will appear at the input of amplifier $A_{13}$ due to the action of diode $D_3$. Amplifier $A_{13}$ therefore adds the previously determined partial Z function from the discriminant computer to the negative I function determined by amplifiers $A_{11}$ and $A_{12}$, giving the desired complete Z function shown above.

It is next necessary to determine the actual changes in the individual color exposure voltages that are to be derived from the discriminant function. The circuit which accomplishes this function is shown in the bottom portion of FIG. 4. The portion of the circuit represented by amplifiers $A_7$–$A_{10}$ derives the voltage $\Delta E_R$, $\Delta E_G$, and $\Delta E_B$; $\Delta E_B$ from the output of amplifier $A_8$, $\Delta E_R$ from the output of amplifier $A_9$, and $\Delta E_G$ from the output of amplifier $A_{10}$.

Figure 4:
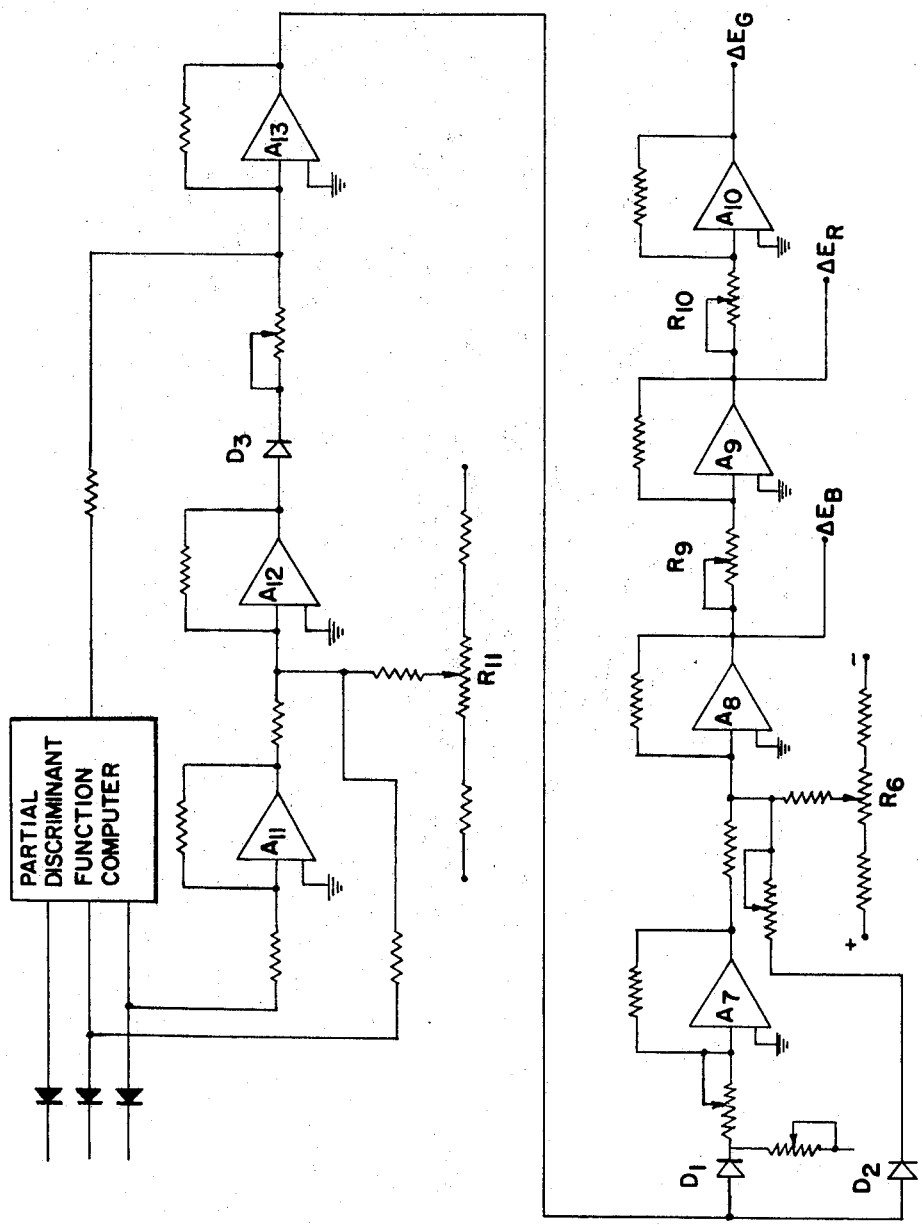
FIG. 4 shows a circuit diagram of the color correction and illuminant circuits.
Figure 5:
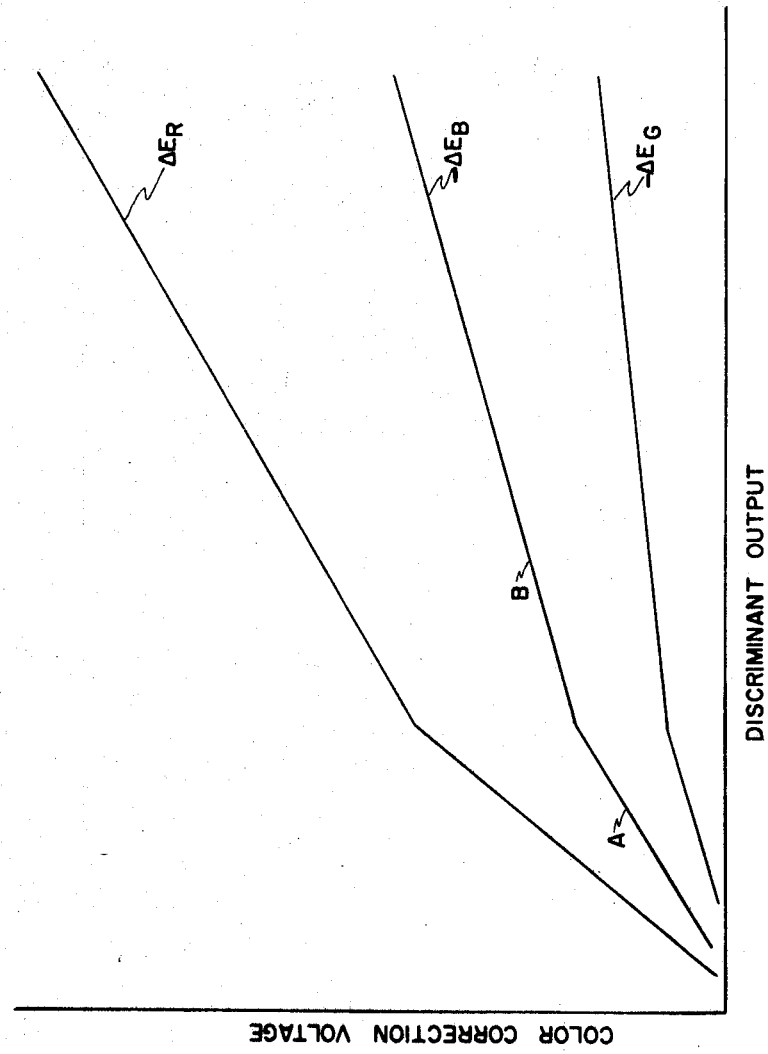
FIG. 5 is a graph showing the outputs of the color correction circuits.

FIG. 5 shows the color correction voltage versus discriminant output volts for each of the color correction amplifiers shown in FIG. 4. Amplifier $A_8$ operates as a conventional feedback amplifier up to the breakpoint voltage level and produces the slope A portion of the curve. After the breakpoint is reached, the output of amplifier $A_7$ subtracts from the input of amplifier $A_8$ thus producing the slope B portion of the curve for $\Delta E_B$. Diode $D_2$ is biased such that only input voltages greater than 0 may become an input to amplifier $A_8$. Diode $D_1$ is biased such that only Z voltages greater than the breakpoint voltage may become an input to amplifier $A_7$. The balance resistor $R_6$ is adjusted to cancel the effect of the constant output voltage level of amplifier $A_7$ due to the bias on diode $D_1$, thus ensuring a zero output for $(Z'-I) <$ zero.

The outputs of amplifiers $A_8$, $A_9$ and $A_{10}$ produce a +Blue, a −Red and a +Green color correction respectively. Gain resistors $R_9$ and $R_{10}$ are adjusted to produce a color correction that is a multiple of the Blue correction. The relationship between the color corrections for a red subject-failure negative has been given above. The color corrections for other color subject failures, however, would be similar.

While we have shown and described certain specific embodiments of our invention, we are aware that many modifications hereof are possible. Our invention, therefore, is not to be limited to the specific structural details shown and described, but is intended to cover all modifications coming within the scope of the appended claims.

We claim:
1. A color balance computer for use in a color printer for making a color print of an image of a color original, said printer having means for automatically correcting the color of said image so that the integrated large area of said image is a hue near gray, said color balance computer comprising:
   (a) first means for producing at least three outputs each representative of the integrated large area density of three different colors of said original,
   (b) second means coupled to said first means for producing an output representative of the likelihood of color subject failure as a predetermined function of said three outputs of said first means,
   (c) third means responsive to said first means for producing an output representative of the likelihood of unbalance of the colors of said original as a predetermined function of two of said three outputs of said first means,
(d) fourth means for combining the output of said third means with the output of said second means to produce a signal, and
(e) fifth means for altering the automatic color correction of said image as a function of said signal so as to produce a print with low likelihood of color subject failure.

2. A color balance computer for use in a color printer for making a color print of an image of a color original, said printer having means for automatically correcting the color of said image so that the integrated large area of said image is a hue near gray, said color balance computer comprising:
(a) first means for producing three outputs, each representative of the integrated large area density of the red, green, and blue, respectively, of said original;
(b) second means coupled to said first means for determining the likelihood $Z'$ of color subject failure as a predetermined function of said three outputs of said first means wherein
$$Z' = \alpha R + \beta G + \gamma B + k_0,$$
$\alpha, \beta, \gamma$ are coefficients,
$k_0$ is a constant,
R, G, and B are voltage analogs of the outputs of said first means,
(c) third means coupled to said first means for determining the likelihood I of color subject failure as a predetermined function of two of said three outputs of said first means wherein
$I = \mu t - k_1$ when
$$t \geq \frac{k_1}{\mu}$$
$I = 0$ when
$$t < \frac{k_1}{\mu}$$
$\mu$ is a coefficient,
$k_1$ is a constant, and
$t$ is a combination of two or more of the R, G, and B voltage analogs,
(d) fourth means for combining the output I of said third means from the output $Z'$ of said second means to produce a discriminant function Z wherein
$$Z = Z' - I$$
and
(e) fifth means for altering the automatic color correction of said image as a function of said discriminant function Z so as to produce a print with low likelihood of color subject failure.

3. A method for making a color print of an image of a color original comprising:
(a) measuring the integrated large area density of three different colors of said original;
(b) determining the likelihood of color subject failure as a predetermined function of said three measurements;
(c) determining the likelihood of color subject failure as a predetermined function of two of said three measurements;
(d) subtracting the likelihood of color subject failure as a predetermined function of two of said three measurements from the likelihood of color subject failure as a predetermined function of said three outputs so as to produce a discriminant function; and
(e) altering the color correction of said image as a function of said discriminant function so as to produce a print of low likelihood of color subject failure.

4. A color balance control means for use in a color printer for making a color print of an image of a color original reproduction of a scene, said printer having means for automatically correcting the average color of said image, said color balance computer comprising:
(a) first means for producing at least three outputs representative of the average density of three different colors of said original respectively;
(b) second means coupled to the outputs of said first means for determining the mathematical probability of the predominance of at least one color in the scene as a predetermined function of said three outputs of said first means and for producing an output representative of such probability;
(c) third means responsive to said first means for determining the mathematical probability of an unusual illuminant color of said scene as a predetermined function of at least two of said three outputs of said first means and for producing an output representative of such probability;
(d) fourth means for combining the output of said third means with the output of said second means to produce a signal; and
(e) fifth means for adjusting the color correction of said image by the color correction means as a function of said signal to produce a print having colors which are in close correlation with the colors of the scene.

5. A color balance control means for use in a color printer for making a color print of an image of a color original reproduction of a scene, said printer having means for automatically correcting the average color of said image, said color balance control comprising:
(a) means for producing outputs representative of the average density of different colors of said original respectively;
(b) means coupled to said first means for determining the mathematical probability of the predominance of at least one color in said scene as a function of said outputs and for establishing a signal representative of such probability; and
(c) means for adjusting the color correcting means in accordance with such signal to produce a print having colors which are in close correlation with the colors of the scene.

6. A color balance computer for use in a color printer for making a color print of an image of a color original reproduction of a scene, said printer having means for automatically correcting the color of said image so that the average color of said image is a hue near gray, said color balance computer comprising:
(a) first means for producing three outputs representative of the average density of three different colors of said original, respectively;
(b) second means coupled to the outputs of said first means for determining the mathematical probability $Z'$ of the predominance of at least one color in said scene in accordance with the following equation:
$$Z' = \alpha R + \beta G + \gamma B + k_0,$$
where
$\alpha, \beta, \gamma$ are coefficients,
$k_0$ is a constant,
R, G, B are the average densities of said colors respectively as represented by the outputs of said first means,
(c) third means responsive to said first means for determining the mathematical probability of an unusual illuminant color of said scene in accordance with the following equation:
$I = \mu t - k_1$ when
$$t \geq \frac{k_1}{\mu}$$
$I = 0$ when
$$t < \frac{k_1}{\mu}$$

where
- $\mu$ is a coefficient,
- $k_1$ is a constant,
- $t$ is a function of the average densities of two of said colors, (d) fourth means for combining the values of $Z'$ and $I$ determined by said second and third means in accordance with the following equation to produce a color correction signal $Z$:
$$Z = Z' - I,$$ and (e) fifth means for adjusting the color correction of said image by the color correction means as a function of said signal $Z$ to produce a print having colors which are in close correlation with the colors of said scene.

References Cited
UNITED STATES PATENTS 3,178,999   4/1965   Clapp _____ 355—38
3,351,766   11/1967   Weisglass _____ 355—38 X NORTON ANSHER, Primary Examiner R. A. WINTERCORN, Assistant Examiner